United States Patent
Likhtarov et al.

(10) Patent No.: US 9,871,855 B2
(45) Date of Patent: Jan. 16, 2018

(54) BALANCING LOAD ACROSS CACHE SERVERS IN A DISTRIBUTED DATA STORE

(71) Applicant: Facebook, Inc., Menlo Park, CA (US)

(72) Inventors: Anton Likhtarov, Palo Alto, CA (US); David Max Meisner, San Francisco, CA (US); Scott David Michelson, Menlo Park, CA (US); Andrii Grynenko, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 501 days.

(21) Appl. No.: 14/491,760

(22) Filed: Sep. 19, 2014

(65) Prior Publication Data

US 2016/0088072 A1 Mar. 24, 2016

(51) Int. Cl.
*G06F 15/173* (2006.01)
*H04L 29/08* (2006.01)
*H04L 12/26* (2006.01)

(52) U.S. Cl.
CPC ...... *H04L 67/1008* (2013.01); *H04L 43/0817* (2013.01)

(58) Field of Classification Search
CPC ........... H04L 67/1008; H04L 29/12132; H04L 43/0817; H04L 67/10; H04L 67/1002; H04L 67/101; H04L 67/1012; H04L 67/1034; G06F 17/30917; G06F 9/5027; G06F 9/505; G06F 17/30067; G06F 17/30595; G06F 17/30914; G06F 17/30985; G06F 2209/5019; G06F 9/5083

USPC ........ 709/203, 217, 223, 226, 231; 707/756; 711/114, 120, 130
See application file for complete search history.

(56) References Cited

U.S. PATENT DOCUMENTS

| | | | |
|---|---|---|---|
| 6,205,489 B1 * | 3/2001 | Kapoor | H04L 29/12066 709/245 |
| 8,762,534 B1 * | 6/2014 | Hong | G06F 9/505 370/389 |
| 2002/0026560 A1 * | 2/2002 | Jordan | G06F 9/505 711/120 |
| 2004/0078474 A1 * | 4/2004 | Ramaswamy | H04L 67/325 709/229 |
| 2007/0143460 A1 * | 6/2007 | Ben-David | G06F 9/505 709/223 |
| 2010/0094966 A1 * | 4/2010 | Zuckerman | H04L 67/1097 709/219 |

(Continued)

*Primary Examiner* — Dustin Nguyen
*Assistant Examiner* — Hao Nguyen
(74) *Attorney, Agent, or Firm* — Perkins Coie LLP

(57) ABSTRACT

A technology for balancing computing resource load across cache servers in a distributed data store is disclosed. The technology can monitor computing resource load on each cache server to increase or decrease an assigned weight of the cache server. The technology can use two hash functions to reallocate, based on the change in the assigned weight, a portion of the key space from one cache server to another. The first hash function can be a consistent hash function that identifies a cache server mapped to an entity identifier. The second hash function can be employed to determine a hash weight of the cache server. The hash weight of the cache server can then be evaluated against the assigned weight to determine whether the entity identifier should remain mapped to the same cache server or should be reevaluated for allocation to a different cache server.

20 Claims, 8 Drawing Sheets

(56) References Cited

U.S. PATENT DOCUMENTS

| | | | | |
|---|---|---|---|---|
| 2011/0268270 A1* | 11/2011 | Vanstone | ............ | H04L 9/0869 380/46 |
| 2011/0276579 A1* | 11/2011 | Colrain | ............ | G06F 17/30557 707/756 |
| 2012/0204176 A1* | 8/2012 | Tian | ............ | G06F 9/505 718/1 |

* cited by examiner

BALANCING LOAD ACROSS CACHE SERVERS IN A DISTRIBUTED DATA STORE

BACKGROUND

In a distributed data store, user data is stored in a persistent storage (e.g., MySQL). In a social network with many millions of users, user data is too big to store on a single database server, and is thus distributed into different shards. Each shard is stored in a logical database and a database server manages one or more shards. Access (e.g., read, write) to the persistent storage can be through cache servers. Each database server maps to a cache server and the two are tied together by a common database identifier (ID).

Hashing is used to map a resource to a cache server (and a logical database) so that a request for that resource gets routed to the cache server storing the resource. A hash function can distribute its input (e.g., the resources) "randomly" among the cache servers. Consequently, each cache server becomes responsible for some of the resources. This has a load balancing effect on the cache servers. However, there are several disadvantages of using this method of hashing. For example, when a new cache server is added or one of the cache servers fails, the hash function changes. This in turn results in remapping of the resources to different cache servers. For example, suppose cache server 3 becomes unavailable in a cluster of cache servers 1-5. Then a resource "abc" that was mapped to cache server 3 gets mapped to a different cache server. In fact, because the number of cache servers is now 4, all the resources get mapped to different cache servers. When a request for the resource "abc" is received by the new cache server, because the resource is cached at the old cache server, it will result in a cache "miss." A cache miss occurs when the requested resource is not in the cache. The new cache server will have to make database queries to fetch that resource. Moreover, because of this remapping, the same resource is now cached at both the old cache server and the new cache server, resulting in data duplication. This increases inefficiency.

To overcome these disadvantages, consistent hashing can be used to consistently map each resource to a particular cache server. However, this type of mapping can lead to imbalance of load across the cache servers. For example, suppose a new cache server is added to a cluster of 24 cache servers. If the new cache server has better hardware and more capacity, that information is not taken into account by consistent hashing. Similarly, although the consistent hashing redistributes the resources more or less evenly among the cache servers, all resources are not equal. Some resources may be requested more often than others. Consequently, some of the cache servers will experience more load than others, leading to a problem of load imbalance (or skew) across the cache servers.

DETAILED DESCRIPTION

Figure 1:
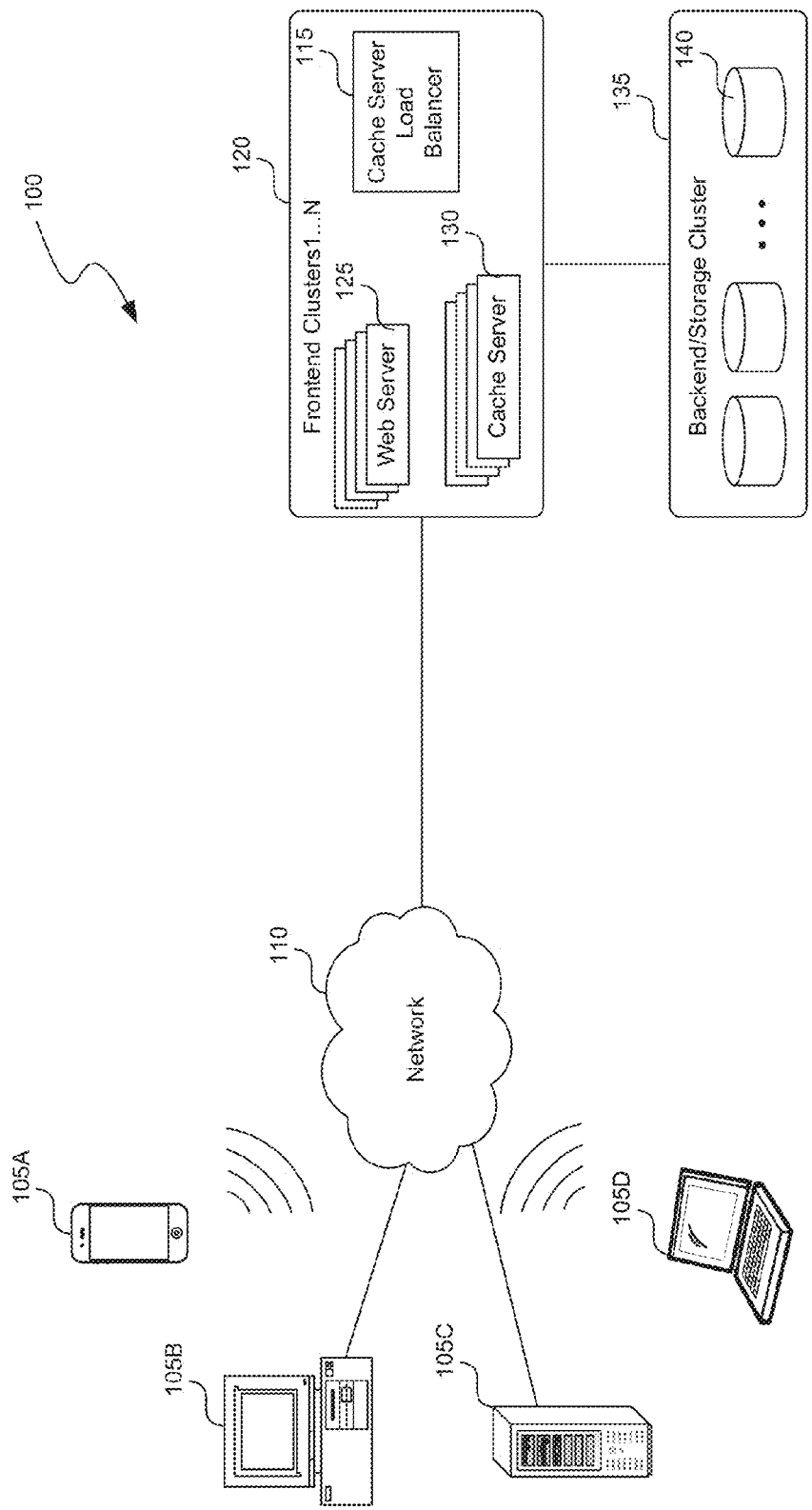
FIG. 1 is a block diagram illustrating an overview of an example of a distributed environment in which some embodiments of the disclosed technology of balancing computing resource load across cache servers may operate.

A technology for balancing computing resource load across cache servers in a distributed data store is disclosed ("technology"). In some embodiments, the technology translates an identifier (ID) space associated with an application or service into a logical database space. The identifier space can include, for example, all the user identifiers. An example of an identifier space can be $[0, \ldots, 2^n-1]$. Using a hash function (or a non-hash function in other embodiments), the identifier space can be translated to the logical database space. The logical database space includes logical database identifiers in the range of $[0, \ldots, N-1]$.

The technology applies a deterministic hash function ("consistent hash") that assures that an entity identifier (e.g., a user identifier, a database identifier) will always map to a cache server that caches information for that entity. Consistently hashing a database identifier returns an index between 0 and M−1, where M is the number of cache servers. As the consistent hash function distributes its input randomly, each cache server is assigned one or more database identifiers, e.g., with uniform distribution.

To spread server computing resource load ("load") evenly across the cache servers, the technology initially assigns each cache server a "weight" of 1.0. The technology monitors a load on each cache server. The load can be based on, for example, a measure of CPU utilization, request rate per entity identifier, latency, cache hit rates, or the like associated with each cache server. As the load on a cache server increases, the technology reduces its weight fractionally. The weight of a cache server determines what proportion of a key space (e.g., database identifiers) will be handled by the cache server. In some embodiments, the weights can be adjusted statically based on simulation results. In other embodiments, the weights can be adjusted automatically (e.g., dynamically) using a feedback control loop. The redistribution of the key space assigned to each cache server also occurs when a new cache server is added or an old cache server is removed (e.g., due to failure or other reasons) to a cluster.

The technology employs a two-stage hash process to ensure that a data request is sent to the correct cache server that has the requested data using just the entity identifier rather than, for example, a table lookup. In a first hashing stage, the entity identifier is hashed using a consistent hashing function to identify a cache server mapped to the entity identifier. In a second hashing stage, the entity identifier is hashed using a second hash function to determine a hash weight of the cache server. The hash weight of the cache server is then evaluated against the assigned weight to determine whether the entity identifier should remain mapped to the same cache server or should be migrated to a different cache server. For example, if the hash weight is greater than the assigned weight, then the entity identifier would need to be migrated or reallocated to a different cache server in order to reduce the load on the cache server and balance the load across all the cache servers. In some embodiments, the two stage hashing process can be retried a number of times (e.g., 32 times) until a cache server that has a determined weight lower than the assigned weight is found.

Various embodiments and implementations of the disclosed technology will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed technology.

FIG. 1 is a block diagram illustrating an overview of an example environment 100 in which some embodiments of the disclosed technology operates. The environment 100 includes one or more client computing devices 105A-D. Client computing devices 105A-D may operate in a networked environment using logical connections to one or more remote computers or web servers 125 in frontend clusters 120 through network. The environment 100 can include one or more frontend clusters 120. The frontend clusters 120 may be located in the same data center or in different data centers (not shown). Each frontend cluster can include a number of web servers 125 and a caching layer. The caching layer includes a number of cache servers 130 that cache data (e.g., in memcache or other suitable cache). The environment 100 also includes one or more backend or storage clusters 135. Each backend cluster 135 includes database servers that manage logical databases 140. The distributed data store in accordance with the disclosed technology includes the caching layer including a set of cache servers 130 and a persistent storage layer including a set of logical databases 140. Each cache server attempts to fetch data from the cache. If data is not available in cache, the cache server contacts a logical database mapped to the cache server to fetch the data.

A request from a user usually reaches a traffic routing server (not shown) first. The traffic routing server directs the request to a frontend cluster 120 that contains data for that user. The cache server load balancer 115 in the frontend cluster 120 has a view of the web servers 125 and the cache servers 130 and ensures that a request associated with or containing an entity identifier consistently maps to the same cache server. In some embodiments, each web server 125 can have its own instance of the cache server load balancer 115 running as a process or library. The cache server load balancer 115 further monitors a load on each of the cache servers 130, so that it can detect when one cache server has a higher load relative to others. The cache server load balancer 115 can then reallocate or re-distribute, based on a change in the assigned weight of a cache server, a fraction of the key space that the cache server is responsible for to one or more other cache servers to reduce the load on that particular cache server. For example, if a cache server's assigned weight changes from 0.7 to 0.6, the cache server load balancer 115 can reduce the load on the cache server by reallocating only 10% of the key space assigned to the cache server to one or more other cache servers. The 60% of the key space assigned to the cache server remains allocated to the same cache server. Similarly, the other 30% of the key space that was previously reallocated from the cache server to other cache servers stay where they are. In this manner, the disclosed technology achieves reallocation or remapping of the key space in a way that results in minimal operational impact.

It should be noted that the term "server" as used throughout this application refers generally to a computer, other device, program, or combination thereof that processes and responds to the requests (e.g., from remote users using client devices across a network 110, from other servers). Servers serve their information to requesting "clients." The term "client" as used herein refers generally to a computer, program, other device, user and/or combination thereof that is capable of processing and making requests and obtaining and processing any responses from servers across a network. Client computing devices and server computing devices may each act as a server or client to other server/client devices. Network 110 can be a local area network (LAN) or a wide area network (WAN), but may also be other wired or wireless networks. The client computing devices 105A-D can be connected to network 110 through a network interface, such as by a wired or wireless network.

Figure 2:
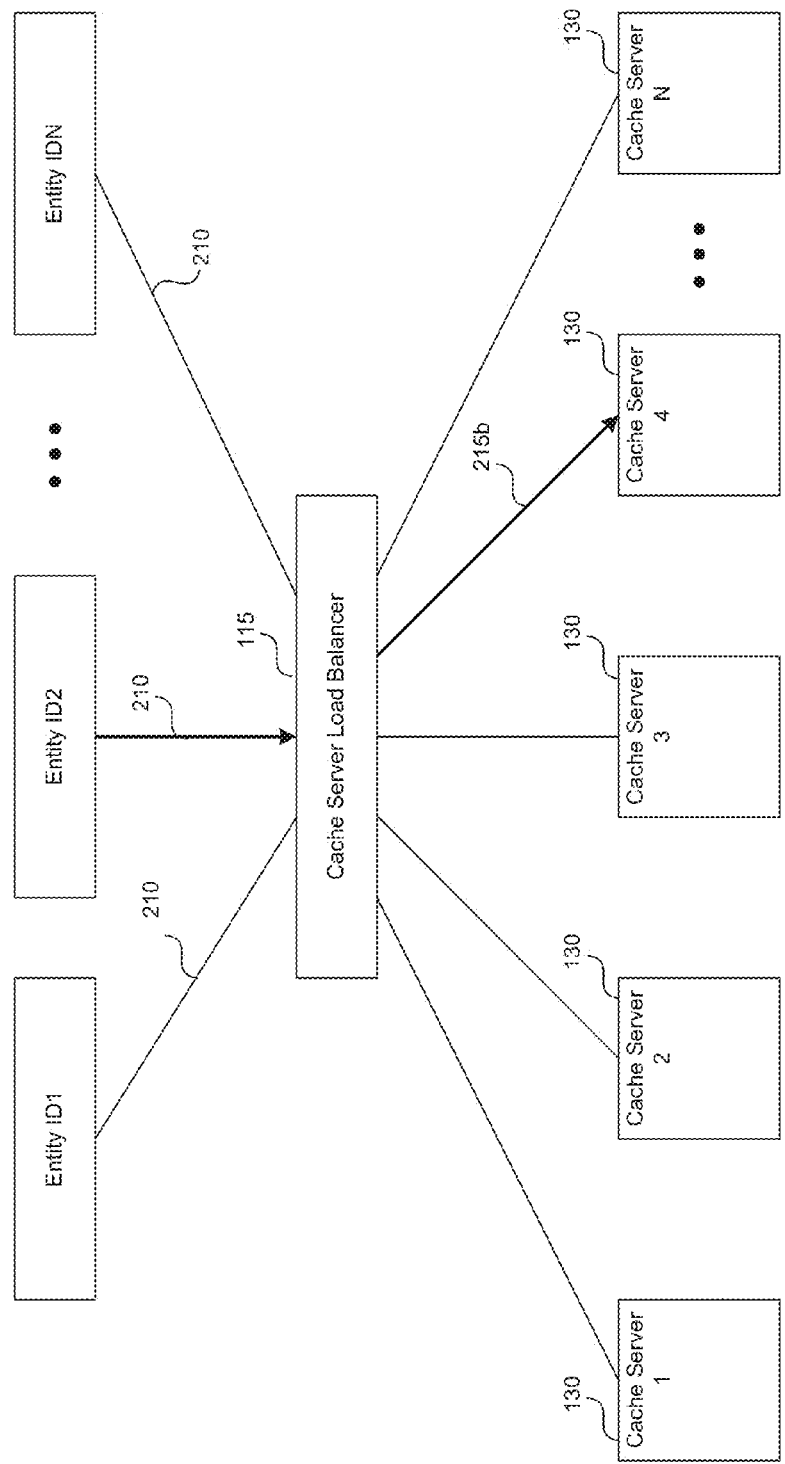
FIG. 2 is a block diagram illustrating deterministic mapping of an entity identifier to a cache server via consistent hashing in some embodiments of the disclosed technology.

FIG. 2 is a block diagram illustrating deterministic mapping of an entity identifier to a cache server via consistent hashing in some embodiments of the disclosed technology.

As illustrated, the cache server load balancer 115 receives requests 210 associated with entity identifiers ID1-N from clients. The cache server load balancer 115 uses consistent hashing to determine the cache servers mapped to the entity identifiers and sends the requests 210 to the respective cache servers 130 (e.g., cache servers 1-N). It should be noted that a client can be a user, a service, an application or the like that has a need for data stored in a cache server and/or a database.

The mapping between the entity identifiers (ID1-IDN) and the cache servers 1-N is deterministic. For example, any request having an entity identifier "ID2" is always mapped to cache server 4. This deterministic mapping is enabled by consistent hashing. Consistent hashing partitions key space among nodes (e.g., cache servers). Consistent hashing can be implemented using a hash function to map both the entity identifiers and the cache servers onto a ring or continuum. Thus, the consistent hash function maps both the cache servers 1-N and the entity identifiers (e.g., 0 to 300000) on a circle. An entity identifier is assigned to the closest cache server going clockwise around the circle. So, each cache server on the circle becomes responsible for a fraction of the entity identifiers. When a new cache server is added, only a small fraction of the entity identifiers that are located near the new cache server are moved to the new cache server. The other entity identifiers stay where they are. Consequently, by using consistent hashing, only a fraction of the entity identifiers get remapped to a new cache server.

Figure 3:
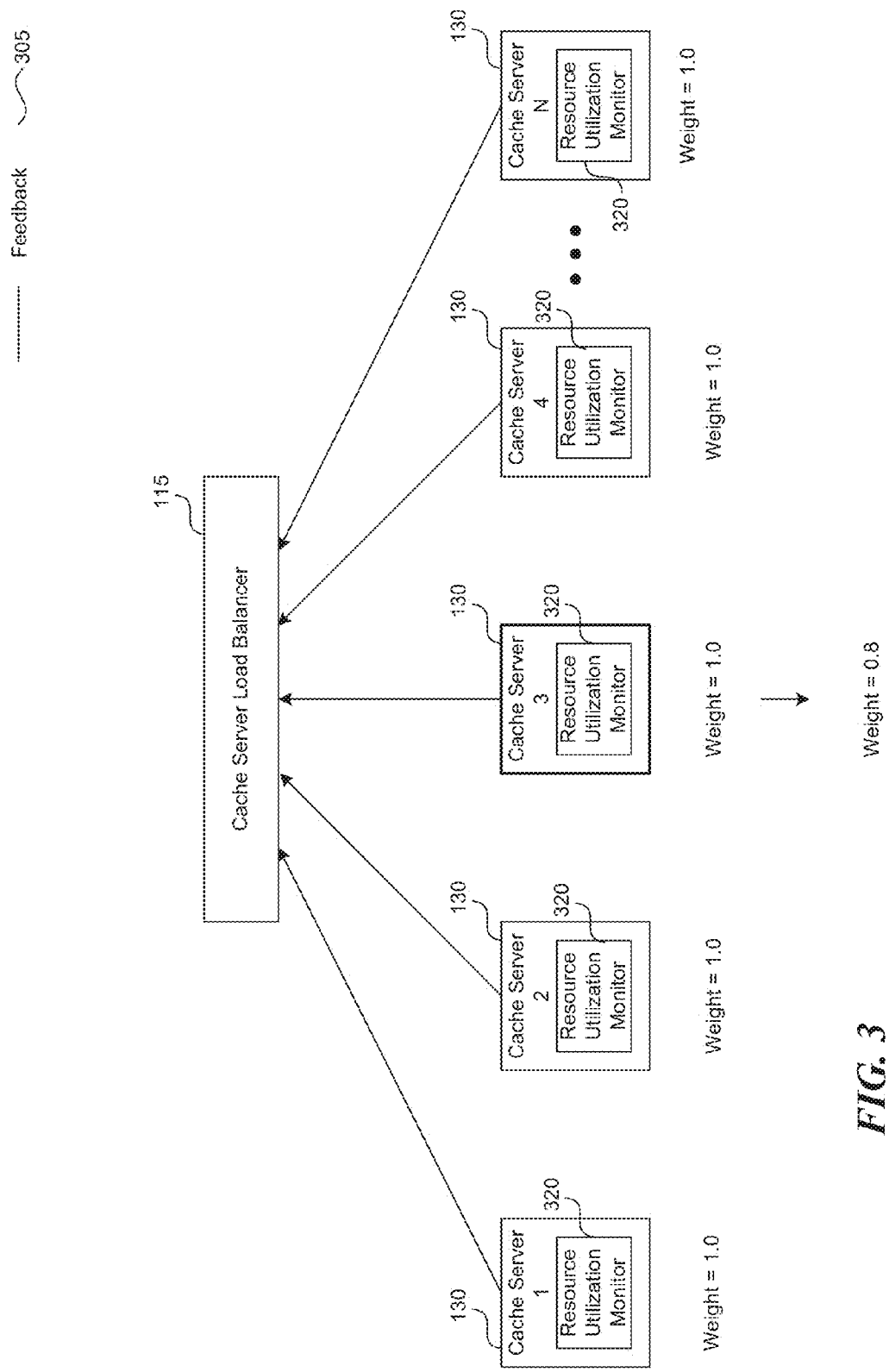
FIG. 3 is a block diagram illustrating adjustments of weights assigned to cache servers based on feedback information in some embodiments of the disclosed technology.

FIG. 3 is a block diagram illustrating adjustments of weights assigned to cache servers based on feedback information in some embodiments of the disclosed technology.

The cache server load balancer 115 initially assigns a weight of 1.0 to each cache server 130 in a cluster. Based on the load on each cache server 130, the cache server load balancer 115 adjusts the weight assigned to each cache server 130. The adjustment of the weights can be made in various ways. In some embodiments, the cache server load balancer 115 can monitor one or more operational parameters associated with the cache servers 130. Examples of operational parameters can include, but are not limited to utilization metrics (e.g., CPU utilization, cache hit rate), number of requests per entity identifier, latency, or the like that are correlated to CPU load. Each cache server 130 can have a resource utilization monitor 320 that measures and reports, periodically or on demand, utilization and/or other data that can provide a measure of a load on the cache server 130 as feedback 305. The cache server load balancer 115 can, based on the feedback, proportionally adjust the weight assigned to each cache server 130. For example, if the current CPU utilization of a cache server goes from 60% to 80%, the cache server load balancer 115 can automatically adjust the weight of that cache server from 1.0 to 0.8. In some other embodiments, a widget or module can monitor how many requests per second each cache server 130 is handling and make adjustments to the assigned weight. Small adjustments can be made iteratively until the CPU utilization, requests per second, cache hit rates or any desired operational parameter is equalized or balanced across the cache servers 1-N in the cluster.

In some other embodiments, the adjustment to the weights of the cache servers 130 can be made statically based on simulation results. For example, a model of the cache server system can be created and different candidate weights can be input into the model along with predicted or historical load constraints to simulate the performance of the cache servers. Based on the results from the simulation, adjustments to the cache server weights can be made until one or more desired operational parameters are balanced across the cache servers.

Figure 4:
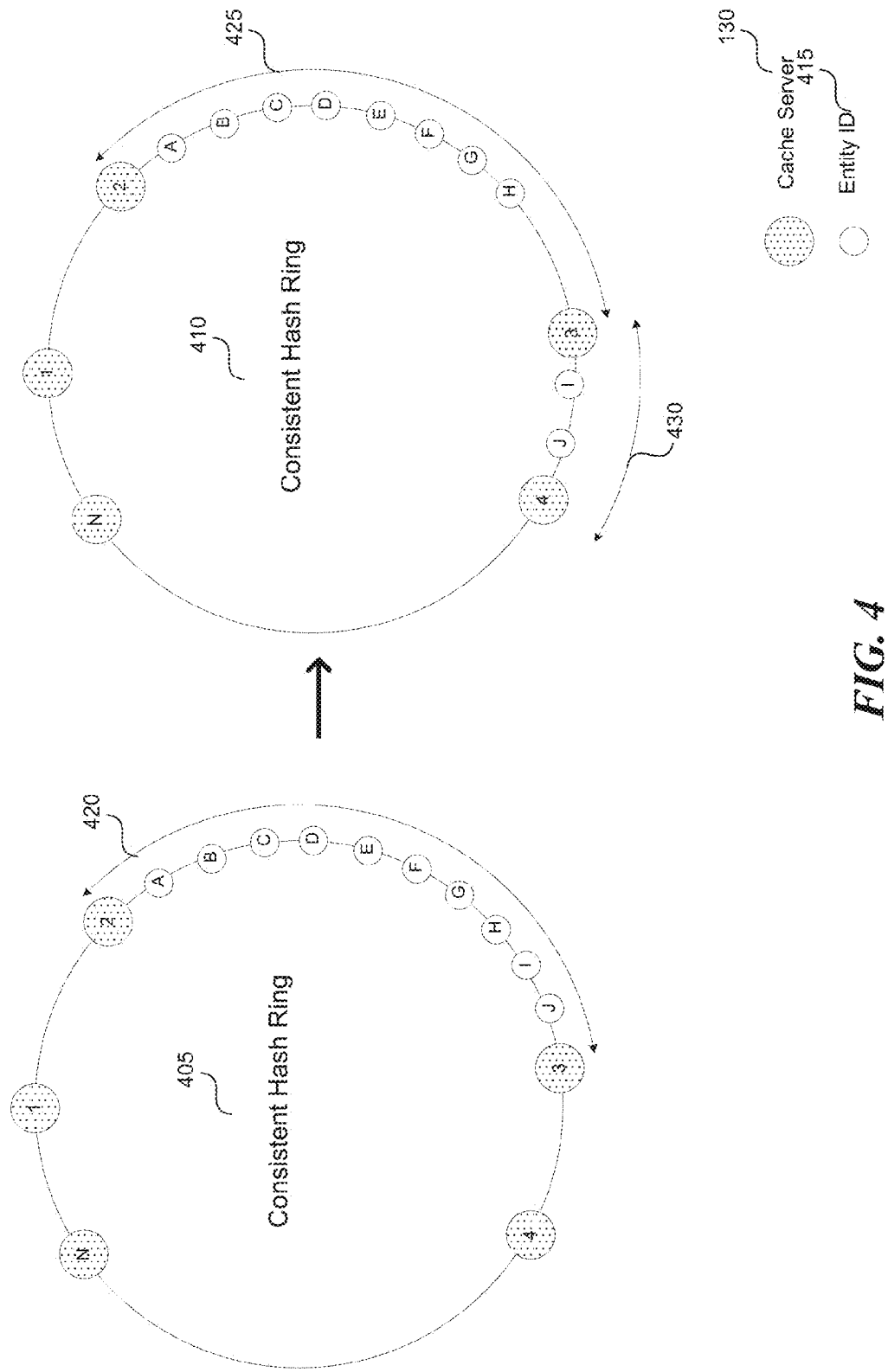
FIG. 4 is a data flow diagram illustrating remapping a fraction of key spaces from one cache server to another in some embodiments of the disclosed technology.

FIG. 4 is a data flow diagram illustrating remapping of a fraction of a key space from one cache server to another for balancing load across the cache servers in a cluster in some embodiments of the disclosed technology.

As illustrated, the cache servers 1-N and the entity identifiers are mapped to points on a consistent hash ring 405. Initially, a weight of 1.0 is assigned to each cache server 130 on the consistent hash ring 405. As illustrated, a key space 420 (i.e., a set of entity identifiers A,-J) are mapped to cache server 3. This means that a request associated with an entity identifier in the key space 420 will be consistently routed to cache server 3 and that cache server 3 will be responsible for fetching data for that request.

Suppose that the CPU utilization of cache server 3 goes up. The cache server load balancer 115 can, in response to the increase in CPU utilization, proportionally decrease the weight assigned to cache server 3. Suppose, the new weight assigned to cache server 3 is 0.8. The decrease in the assigned weight results in migration of a portion of the key space 420 from cache server 3 to cache server 4. As illustrated, cache server 3 is now responsible for key space 425 (entity identifiers A-H) which is a fraction of the key space 420 (entity identifiers A-J) that cache server 3 was initially responsible for. Cache server 4 is now responsible for key space 430 that includes entity identifiers I-J that were previously mapped to cache server 3. In this example, adjusting a weight of the overloaded cache server 3 from 1.0 to 0.8 caused 20% of the entity identifiers that cache server 3 was responsible for to be reallocated to cache server 4. Because of the consistent hashing property, cache server 3 remains responsible for the original 80% of the entity identifiers and thus, most of the cached data that persists is valid and capable of generating cache hits. The remaining cached data associated with the entity identifiers that are reallocated can be flushed to maintain cache consistency and reduce data duplication. None of the other cache servers on the cluster lose any cached data as a result of the reallocation of entity identifiers I. J from cache server 3 to cache server 4. So the other cache servers can also generate cache hits.

Figure 5:
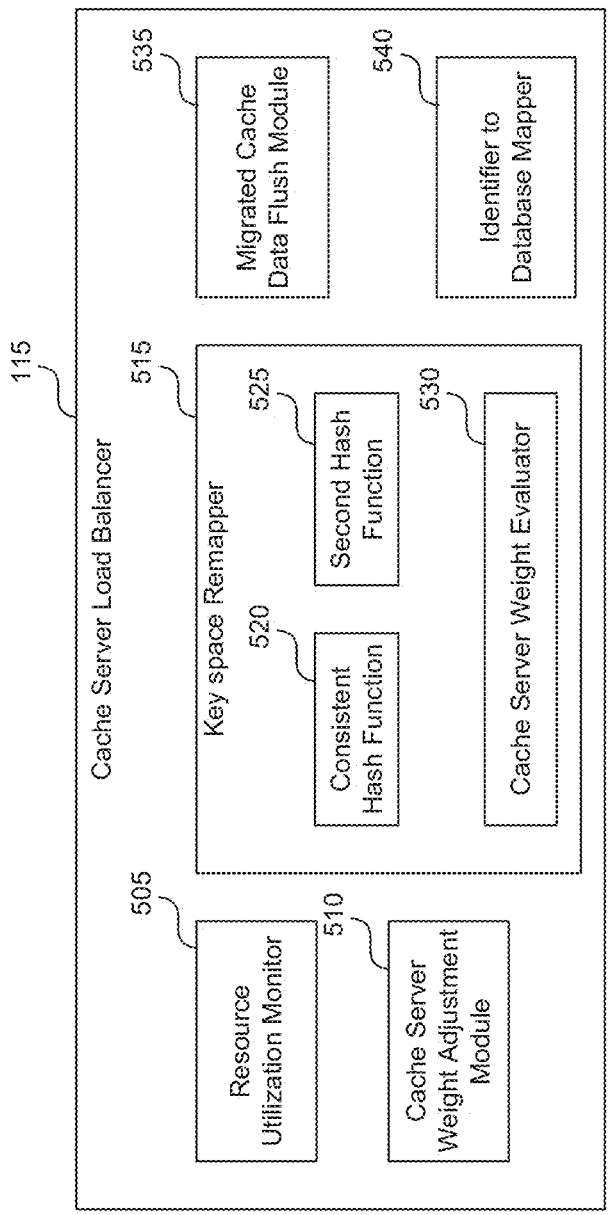
FIG. 5 is a block diagram illustrating example components of a cache server load balancer in some embodiments of the disclosed technology.

FIG. 5 is a block diagram illustrating example components of a cache server load balancer 115 in some embodiments of the disclosed technology.

As described above, in various embodiments, the cache server load balancer 115 can be a process or library running a web server or on another machine. In some embodiments, the cache server load balancer 115 includes a resource utilization monitor 505, a cache server weight adjustment module 510, a key space remapper 515, a migrated cache data flush module 535 and an identifier to database mapper 540.

The resource utilization monitor 505, in some embodiments, can monitor CPU utilization, request rates (e.g., requests per second per database identifier), cache hit rates and/or any other operational parameter that is correlated to or provides a measure of a load on a cache server. In some embodiments, the monitoring of the operational parameters can be facilitated by resource utilization monitoring components in the cache servers and/or database servers.

Initially, the cache server weight adjustment module 510 assigns each cache server a weight of 1.0. The cache server weight adjustment module 510 then uses the feedback information to automatically adjust the assigned weights. In some embodiments, the adjustment to the assigned weights can be proportional to the change in the resource utilization metric. For example, if the CPU utilization of a cache server increases from 60% to 80%, the 20% increase in CPU utilization can result in proportional decrease in assigned weight from 1.0 to 0.8.

In some embodiments, the cache server weight adjustment module 510 can model the distributed system and run simulations based on current or predicted load (e.g., requests per second) to determine a set of weights for the cache servers. The cache server weight adjustment module 510 can adjust the weights based on results from the simulation and evaluate the resource utilization metric iteratively until all the cache servers have similar or equal resource utilization.

The identifier to database mapper 540 can map identifiers to databases where data associated with the identifiers are located. Examples of the identifiers can include user identifiers, object identifiers, or the like. The identifier to database mapper 540 can be based on a function (e.g., a hash function) that maps an identifier space of $[0, \ldots, 2^n-1]$ to a database space of $[0, \ldots, N-1]$.

The key space remapper 515 deterministically maps and remaps key spaces to specific cache servers based on the assigned weights. Initially, all the cache servers in a cluster are assigned a weight of 1.0. As the load on the cache servers increase, the weight of the cache servers are decreased proportionally. Based on the set of weights and the number of cache servers in the cluster and using a consistent hash function 520 and a second hash function 525, the key space remapper 515 re-distributes a portion of the key space from one cache server to another. This re-distribution balances the load across the cache servers in the cluster, with minimal disruption.

The consistent hash function 520, as described with respect to FIGS. 2 and 4, can be a consistent hash ring or any other consistent hash structure that deterministically maps each key (e.g., entity identifier) to a cache server. The consistent hash function 520 takes as input a key and the number of cache servers and returns a cache server to which the key is mapped. The second hash function 525 takes as input the key and returns as output a hash weight that can be scaled to be in the range of 0 to 1. The second hash function 525 can be any suitable hash function. For example, in one implementation, the second hash function 525 can be spooky hash function. The evaluation module 530 then evaluates the hash weight from the second hash function 525 that is in the range of 0 to 1 against the weight assigned to the cache server ("assigned weight") to which the key is mapped. If the hash weight is less than the assigned weight, the key remains mapped to the same cache server. If the hash weight is greater than or equal to the assigned weight, the evaluation module 530 salts the original key and provides the modified key to the consistent hash function 520 and the second hash function 525. In some embodiments, the salting process can include appending to the original key a string that increments with each iteration. This process of evaluation repeats until the evaluation module 530 can identify a new cache server with an assigned weight that is lower than the hash weight. The original key is then remapped to that new cache server. This remapping is also deterministic. In other words, any request associated with that key gets mapped to the new cache server if there is no change in the weight of that cache server.

The migrated cache data flush module 535, in some embodiments, preemptively flushes cache data following migration of a portion of a key space from one cache server to another cache server to maintain cache consistency. For example, an entity identifier can get remapped from cache server 1 to cache server 2 in the process of balancing the load across the cache servers. This can happen when, for example, cache server 1 fails or the weight of cache server 1 is reduced. However, the entity identifier can get eventually get remapped back to cache server 1 when the situation is reversed (e.g., cache server 1 comes back up or the weight of cache server 1 is increased to the previous value). When this happens, the data of the entity identifier can still be in the cache of cache server 1 when the entity identifier is remapped back to cache server 1. However, the data could have been modified while the entity identifier was mapped to cache server 2. To prevent cache inconsistency, the migrated cache data flush module 535 flushes out any data related to the migrated entity identifiers from the cache server. The rest of the data is allowed to stay on.

The migrated cache data flush module 535 can clear out the migrated data from the cache based on the entity identifier. This can be illustrated using example data in table 1. The migrated cache data flush module can compare, for each database identifier, the old cache server index and the new cache server index to determine if the database identifier migrated from one cache to another. In table 1, database ID 1 was previously assigned to cache server 7 and is now assigned to cache server 6. Based on the difference between the old and cache server indices, the migrated cache data flush module 535 can clear out all data associated with database ID 1 from cache server 7, thereby preventing stale or inconsistent data from being read.

In some embodiments, use of database identifiers, instead of any other entity identifiers (e.g., user identifier) makes this process more efficient as the migrated cache data flush module 535 need only loop through a 0 to N−1 database identifiers to identify the database identifiers that have migrated. Using hashed user identifiers for the same process can be computationally more expensive because of the nature of hashed values.

TABLE 1

Data for Identifying Remapped Database Identifiers

| Database ID | Old Cache Server Index | New Cache Server Index |
|---|---|---|
| 0 | 5 | 5 |
| 1 | 7 | 6 |
| 2 | 7 | 7 |
| . . . | . . . | . . . |
| N-1 | 999 | 999 |

Figure 6:
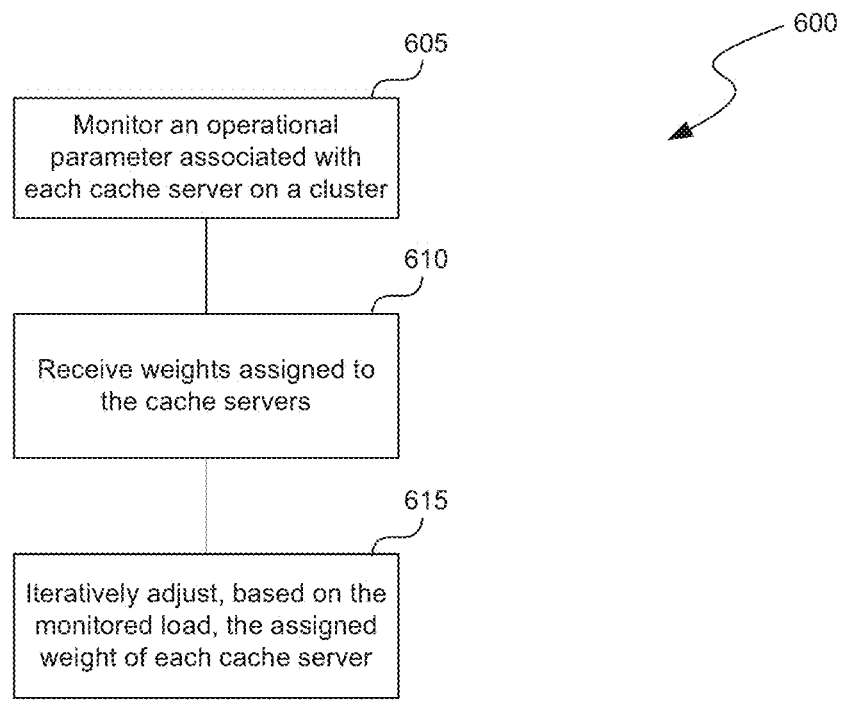
FIG. 6 is a logic flow diagram illustrating an example method of adjusting weights assigned to cache servers in a cluster based on computing resource load on the cache servers in some embodiments of the disclosed technology.

FIG. 6 is a logic flow diagram illustrating an example method of adjusting weights assigned to a set of cache servers in a cluster based on load on the cache servers in some embodiments of the disclosed technology.

The method 600 starts with the cache server load balancer 115 monitoring a load on each cache server on the cluster at block 605. Monitoring the load can include monitoring requests per second received by the cache server and/or database server, a cache hit rate, a CPU utilization, or the like. The cache server load balancer 115 obtains weights assigned to the cache servers at block 610. Initially, each cache server is assigned a weight of 1.0. The cache server load balancer 115 the iteratively adjusts the assigned weight of each cache server based on the monitored load at block 615 to balance the load across the cache servers.

Figure 7:
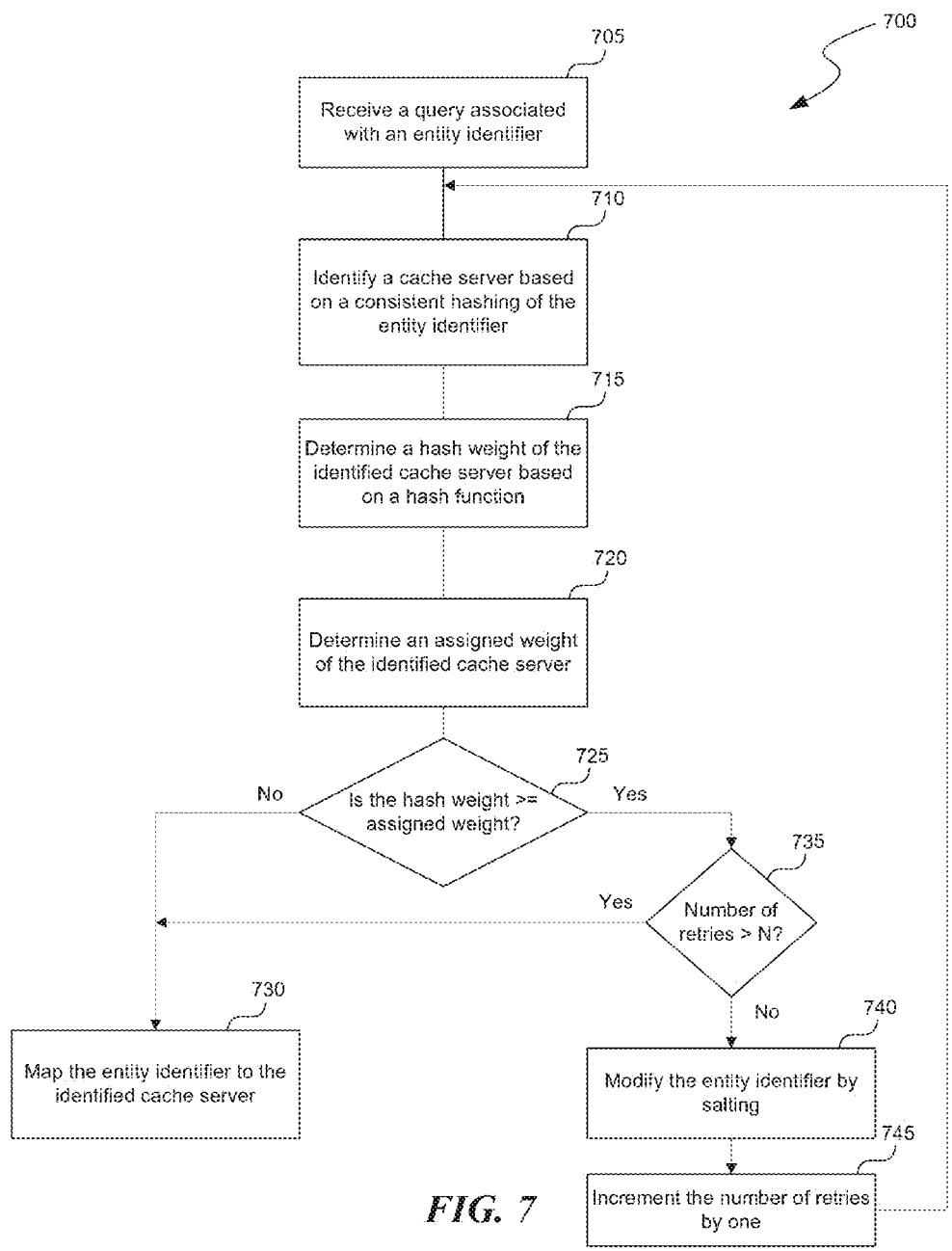
FIG. 7 is a logic flow diagram illustrating an example method of remapping an entity identifier to a cache server in some embodiments of the disclosed technology.

FIG. 7 is a logic flow diagram illustrating an example method of remapping an entity identifier to a cache server in some embodiments of the disclosed technology.

The method 700 starts with the cache server load balancer 115 receiving a query associated with an entity identifier. The entity identifier can be a user identifier or a database identifier in some embodiments. The database identifier can be determined from the entity identifier using an identifier to database mapping function. Each entity identifier is consistently mapped to a cache server. At block 710, the cache server load balancer 115 identifies a cache server mapped to the entity identifier based on a consistent hashing of the entity identifier and the number of cache servers in a cluster.

At block 715, the cache server load balancer 115 determines a hash weight of the identified cache server based on another hash function (e.g., spooky hash) that is different from the consistent hash function of block 710. The cache server load balancer 115 also determines an assigned weight for the identified cache server. If the hash weight is less than the assigned weight, as determined at decision block 725, the cache server load balancer 115 maps the entity identifier to the identified cache server at block 730. In other words, the identified cache server remains responsible for the entity identifier. Alternatively, if the hash weight is greater than or equal to the assigned weight, the entity identifier would need to be remapped to another cache server to reduce the load on the cache server. In some embodiments, the process of finding another cache server to which the entity identifier can be mapped can take a number of iterations. To limit the number of times the process is repeated, a decision block 735 can check if the number of retries greater than or equal to N. N can be any suitable number (e.g., 32). If the number of retries is less than or equal to N, the cache server load balancer 115 attempts to find a cache server by modifying the entity identifier by salting it at block 740. For example, if the entity identifier is "ABC," the modified entity identifier can be "ABC0." At block 745, the cache server load balancer can increment the number of retries by one and loops back to block 710 to identify a cache server based on a consistent hashing of the modified entity identifier (e.g., ABC0) and determine a hash weight of the identified cache server by hashing the modified entity identifier using the second hash function at block 720. The cache server load balancer 115 then compares the hash weight to the assigned weight to determine if the original entity identifier maps to the newly identified cache server at block 730, or if the process is to be repeated again by salting the entity identifier. Each time the process is repeated, the original entity identifier is salted to obtain a modified key identifier, for example, ABC1, ABC2, ABC3 and so on. This remapping is also deterministic. In some embodiments, when N number of attempts have been made to identify a cache server to map the entity identifier as determined at decision block 735, the cache server load balancer can map the entity identifier to the last identified cache server, the first identified cache server or any random cache server.

Figure 8:
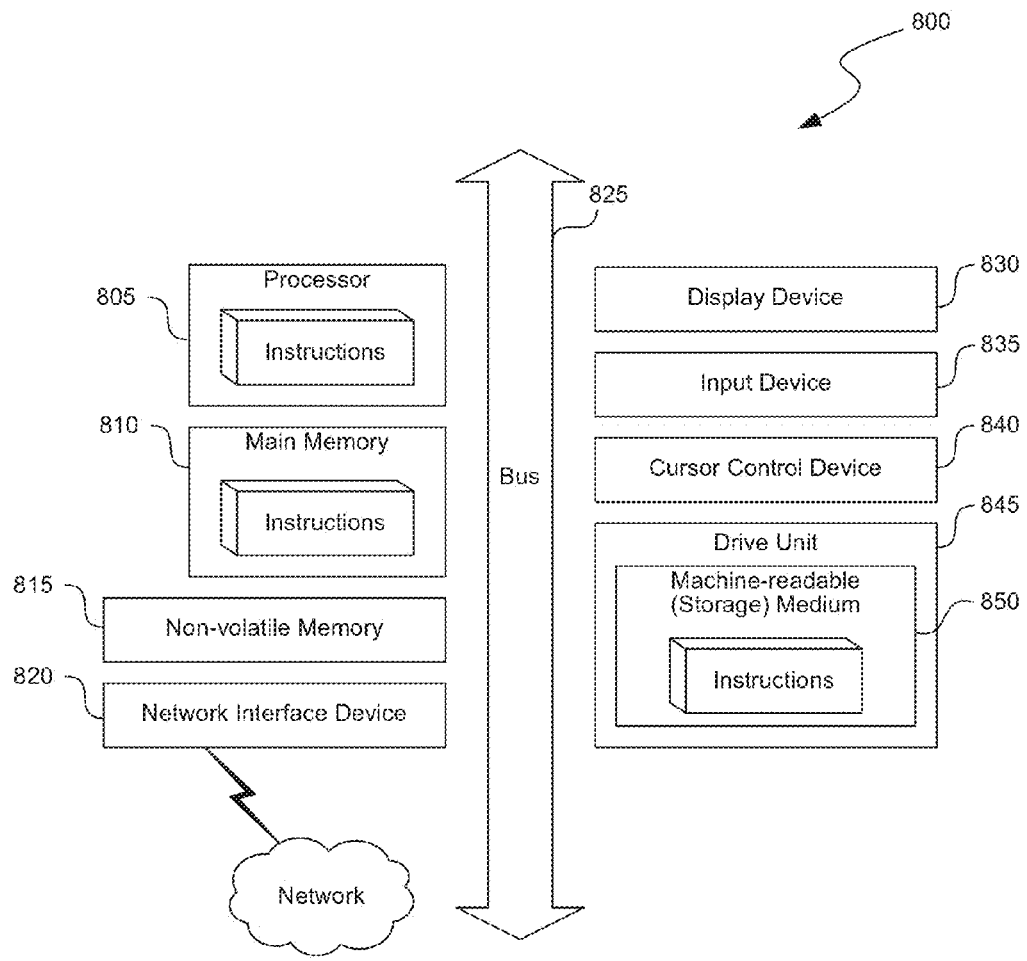
FIG. 8 is a block diagram illustrating a computer system within which a set of instructions, for causing the computer system to perform any one or more of the methodologies discussed herein, can be executed.

FIG. 8 is a block diagram illustrating a diagrammatic representation of a computer system 800 on which the embodiments of the present disclosure can be implemented. For example, the cache server load balancer 115, the web server 125, cache servers 130, databases 140 and client devices 105A-D can be implemented on the computer system 800.

The computer system 800 generally includes a processor 805, main memory 810, non-volatile memory 815, and a network interface device 820. Various common components (e.g., cache memory) are omitted for illustrative simplicity. The computer system 800 is intended to illustrate a hardware device on which any of the components depicted in the example of FIGS. 1, 2, 3 and 5 (and any other components described in this specification) and methods described in the example of FIGS. 6-7 can be implemented. The computer system 800 can be of any applicable known or convenient type. The components of the computer system 800 can be coupled together via a bus 825 or through some other known or convenient device.

The processor 805 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 810 is coupled to the processor 805 by, for example, a bus 825 such as a PCI bus, SCSI bus, or the like. The memory 810 can include, by way of example but not limitation, random access memory (RAM), such as dynamic RAM (DRAM) and static RAM (SRAM). The memory 810 can be local, remote, or distributed.

The bus 825 also couples the processor 805 to the non-volatile memory 815 and drive unit. The non-volatile memory 815 is often a magnetic floppy or hard disk, a magnetic-optical disk, an optical disk, a read-only memory (ROM), such as a CD-ROM, EPROM, or EEPROM, a magnetic or optical card, SD card, or another form of storage for large amounts of data. Some of this data is often written, by a direct memory access process, into memory during execution of software in the computer system 800. The non-volatile memory 815 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 815 and/or the drive unit 845. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory 810 in this disclosure. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 825 also couples the processor to the network interface device 820. The interface can include one or more of a modem or network interface. It will be appreciated that a modem or network interface can be considered to be part of the computer system 800. The interface can include an analog modem, isdn modem, cable modem, token ring interface, satellite transmission interface (e.g., "direct PC"), or other interfaces for coupling a computer system to other computer systems. The interface can include one or more input and/or output devices 835. The I/O devices can include, by way of example but not limitation, a keyboard, a mouse or other pointing device, disk drives, printers, a scanner, speaker, DVD/CD-ROM drives, disk drives, and other input and/or output devices, including a display device. The display device 830 can include, by way of example but not limitation, a cathode ray tube (CRT), liquid crystal display (LCD), LED display, a projected display (such as a heads-up display device), a touchscreen or some other applicable known or convenient display device. The display device 830 can be used to display text and graphics. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 815 and/or drive unit 845 and causes the processor to execute the various acts required by the operating system to input and output data and to store data in the memory, including storing files on the non-volatile memory 815 and/or drive unit 845.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the technology is not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer (e.g., a database server), a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium 850 is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technology. Thus, machine-readable media can include "non-transitory" media (e.g., memory) or "transitory" media (e.g., a signal).

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), SD cards, among others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made. Accordingly, the embodiments are not limited except as by the appended claims.

We claim:

1. A method, comprising:
distributing a set of entity identifiers among cache servers in a cluster of cache servers, each cache server having associated therewith a subset of the set of entity identifiers;
monitoring an operational parameter associated with each cache server in the cluster, the operational parameter providing a measure of a computing resource load on the cache server;
adjusting, based on a value of the operational parameter, a weight assigned to a first cache server among the cache servers to balance the computing resource load across the cache servers, wherein adjusting the weight generates an adjusted weight; and
re-distributing, based on the adjusted weight of the first cache server, a specified entity identifier of the subset of the set of entity identifiers from the first cache server to a specified cache server of the cache servers in the cluster to balance the computing resource load across the cache servers, wherein the redistributing includes:
determining, using a consistent hash function, a specified cache server of the cache servers mapped to a modified version of the specified entity identifier,
confirming that a hash weight of the specified cache server is less than an assigned weight of the specified cache server, the hash weight of the specified cache server computed using a second hash function with the modified version of the specified entity identifier as an input, wherein the determining and confirming is performed repeatedly, after salting the specified entity identifier to generate the modified version in each repetition, until the hash weight is less than the assigned weight, and
assigning, in response to the confirming, the specified entity identifier to the specified cache server.

2. The method of claim 1, wherein the operational parameter is one of: a CPU utilization, a cache hit rate or a number of requests per entity identifier.

3. The method of claim 1, wherein the adjusting includes decreasing the weight assigned to the first cache server when the value of the operational parameter indicates an increased computing resource load on the first cache server.

4. The method of claim 3, further comprising flushing out data related to the specified entity identifier from the first cache server to prevent cache inconsistency.

5. The method of claim 1, wherein the modified version of the specified entity identifier includes the specified entity identifier with a string appended thereto, wherein the string is different in each repetition.

6. The method of claim 1, wherein an entity identifier from the set of entity identifiers is one of a user identifier or a database identifier, wherein each database identifier is mapped to a cache server among the cache servers in the cluster.

7. A non-transitory computer-readable storage medium storing instructions, comprising:
instructions for receiving a request including an identifier;
instructions for determining, using a consistent hash function, that the identifier is allocated to a first cache server among a plurality of cache servers;
instructions for computing a hash weight of the first cache server using a specified hash function;
instructions for receiving an assigned weight of the first cache server;
instructions for comparing the hash weight against the assigned weight to reallocate the identifier to a second cache server among the plurality of cache servers to balance computing resource load across the plurality of cache servers, wherein the instructions for comparing include:
instructions for determining one of the cache servers as the second cache server based on the consistent hash function, the consistent hash function using a modified version of the identifier as an input,
instructions for confirming that a hash weight of the second cache server is less than an assigned weight of the second cache server, the hash weight computed using the specified hash function with the modified version of the identifier as an input, wherein the determining and confirming is performed repeatedly, after salting the identifier to generate the modified version in each repetition, until the hash weight is less than the assigned weight, and
instruction for reallocating the identifier to the second cache server.

8. The non-transitory of claim 7, further comprising instructions for reallocating the identifier to the second cache server when the hash weight is greater than or equal to the assigned weight of the first cache server.

9. The non-transitory of claim 8, further comprising instructions for flushing cached elements associated with the identifier from the first cache server when the identifier is reallocated to the second cache server to prevent cache inconsistency, wherein the identifier is a database identifier.

10. The non-transitory of claim 8, wherein the modified identifier is salted by appending a string to the identifier, wherein a different string is used in each repetition.

11. The non-transitory of claim 7, wherein the identifier is one of: a user identifier or a database identifier, wherein each database identifier is mapped to a cache server.

12. The non-transitory of claim 7, further comprising:
instructions for monitoring computing resource load on each of the plurality of cache servers; and
instructions for detecting an increase in the computing resource load on the first cache server.

13. The non-transitory of claim 10, further comprising instructions for decreasing an assigned weight of the first cache server in proportion to the increase in the computing resource load on the first cache server.

14. The non-transitory computer-readable medium of claim 10, wherein the computing resource load on each of the plurality of cache servers is measured based on a number of requests per second per entity identifier, CPU utilization, a cache hit rate or a combination of thereof.

15. A system, comprising:
a cluster including a plurality of cache servers, wherein each cache server has a processor and a memory; and
a module for balancing computing resource load across the plurality of cache servers;
wherein the module is configured to:
  allocate a key space to each cache server in the plurality of cache servers so that each cache server is associated with the key space allocated to the cache server;
  monitor an operational parameter associated with each cache server, the operational parameter providing a measure of computing resource load on the cache server;
  detect, based on a value of the operational parameter associated with a first cache server, an increased computing resource load on the first cache server;
  adjust an assigned weight of the first cache server among the plurality of cache servers to reduce the computing resource load on the first cache server, wherein the assigned weight is adjusted to generate an adjusted weight; and
  reallocate, based on the adjusted weight of the first cache server, a specified identifier in the key space from the first cache server to a specified cache server of the plurality of cache servers, wherein the module is configured to reallocate by:
    determining, using a consistent hash function, a specified cache server of the cache servers mapped to a modified version of the specified identifier,
    confirming that a hash weight of the specified cache server is less than an assigned weight of the specified cache server, the hash weight computed using a second hash function with the modified version of the specified identifier as an input, wherein the determining and confirming is performed repeatedly, after salting the specified identifier to generate the modified version in each repetition, until the hash weight is less than the assigned weight of the specified cache server, and
    reallocating the specified identifier to the specified cache server.

16. The system of claim 15, wherein the key space includes a set of user identifiers or database identifiers.

17. The system of claim 15, wherein the module is further configured to:
  apply the consistent hash function to determine a cache server allocated to each identifier in the key space;
  apply the second hash function to compute a hash weight of the cache server allocated to the corresponding identifier;
  receive an assigned weight of the cache server; and
  compare the hash weight of the cache server against the assigned weight to determine whether to allocate the identifier to the cache server or to recursively apply the consistent hash function and the second hash function to the identifier, after salting the identifier.

18. The system of claim 15, wherein the module is further configured to flush cached elements associated with the specified identifier from the first cache server when the portion of the key space is reallocated to prevent cache inconsistency.

19. The system of claim 15, wherein the operational parameter includes a request rate per identifier, CPU utilization or a cache hit rate.

20. The method of claim 1, wherein modifying the specified entity identifier includes:
  confirming that a hash weight of the first cache server is greater than or equal to the adjusted weight, the hash weight computed using the second hash function with the specified entity identifier as an input.

* * * * *